(12) United States Patent
De Wever et al.

(10) Patent No.: US 10,410,387 B2
(45) Date of Patent: Sep. 10, 2019

(54) SYSTEM AND METHOD FOR GENERATING USER INTERFACE ELEMENTS

(71) Applicant: Fomtech Limited, London (GB)

(72) Inventors: Martijn De Wever, London (GB); Sasha Imamovich, London (GB)

(73) Assignee: FOMTECH LIMITED, London (GB)

( * ) Notice: Subject to any disclaimer, the term of this patent is extended or adjusted under 35 U.S.C. 154(b) by 36 days.

(21) Appl. No.: 15/717,593

(22) Filed: Sep. 27, 2017

(65) Prior Publication Data

US 2019/0096101 A1 Mar. 28, 2019

(51) Int. Cl.
| | | |
|---|---|---|
| *G06T 11/60* | (2006.01) | |
| *G06T 11/20* | (2006.01) | |
| *G06F 16/951* | (2019.01) | |
| *G06F 3/0488* | (2013.01) | |
| *G06F 3/0481* | (2013.01) | |
| *G06F 3/0485* | (2013.01) | |
| *G06F 3/0484* | (2013.01) | |
| *G06T 13/80* | (2011.01) | |

(52) U.S. Cl.
CPC .......... *G06T 11/206* (2013.01); *G06F 3/0481* (2013.01); *G06F 3/0488* (2013.01); *G06F 3/04855* (2013.01); *G06F 16/951* (2019.01); *G06F 3/04842* (2013.01); *G06F 3/04883* (2013.01); *G06T 11/60* (2013.01); *G06T 13/80* (2013.01); *G06T 2200/24* (2013.01)

(58) Field of Classification Search
CPC ..................................................... G06F 3/0481
USPC ....................................................... 345/440
See application file for complete search history.

(56) References Cited

U.S. PATENT DOCUMENTS

| | | | | |
|---|---|---|---|---|
| 6,983,424 B1 * | 1/2006 | Dutta | .................. | G06F 3/04817 715/790 |
| 2008/0243787 A1 | 10/2008 | Stading | | |
| 2014/0040826 A1 * | 2/2014 | Wei | ...................... | G06F 3/0488 715/810 |
| 2017/0098318 A1 | 4/2017 | Iannaccone et al. | | |

FOREIGN PATENT DOCUMENTS

| | | |
|---|---|---|
| EP | 1672589 A1 | 6/2006 |
| WO | WO 2010/111351 A1 | 9/2010 |

OTHER PUBLICATIONS

European Patent Application No. 17193592.7; Extended Search Report; dated Mar. 8, 2018; 8 pages.

* cited by examiner

*Primary Examiner* — Thomas J Lett
(74) *Attorney, Agent, or Firm* — BakerHostetler

(57) ABSTRACT

A system for generating user interface elements comprises a data analysis module, an element generation module and a positioning module. The data analysis module is arranged to identify a plurality of classes in input data, wherein each class is associated with at least one characteristic value. The element generation module is arranged to generate a plurality of user interface elements each associated with a class by calculating, for each user interface element, at least one value indicative of a two-dimensional area based on the characteristic value associated with the class of the element. The positioning module is arranged to generate a position layout by determining positions for the user interface elements, wherein each position is determined independently of an axis associated with a class or a variable relating to a class.

20 Claims, 10 Drawing Sheets

FIG. 1
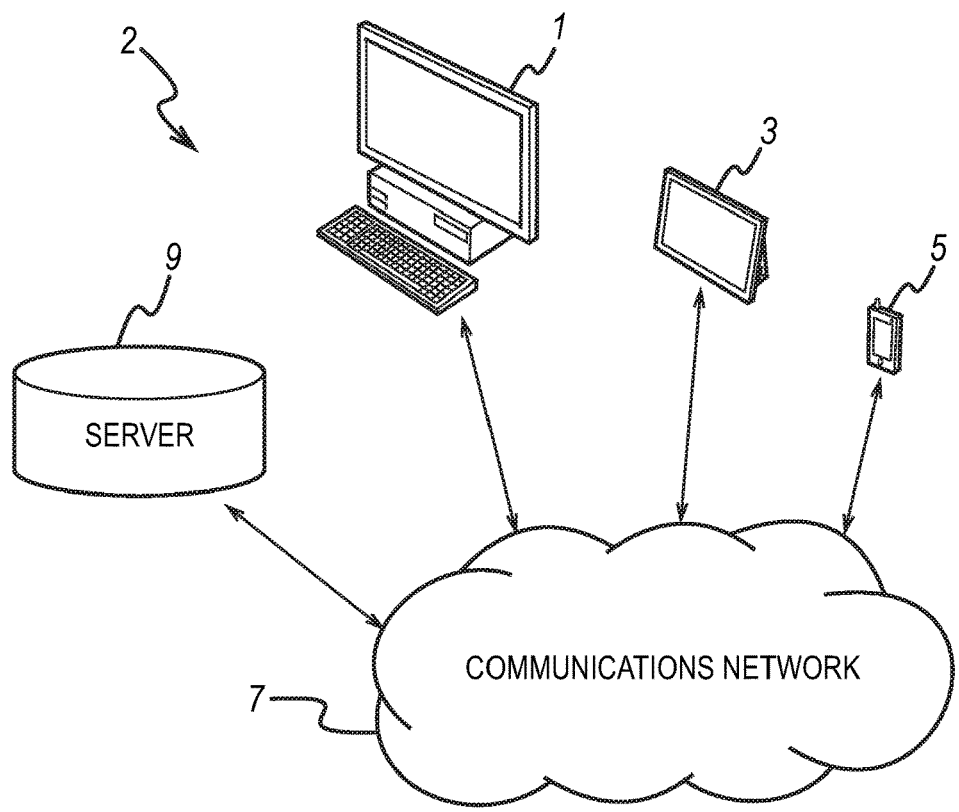
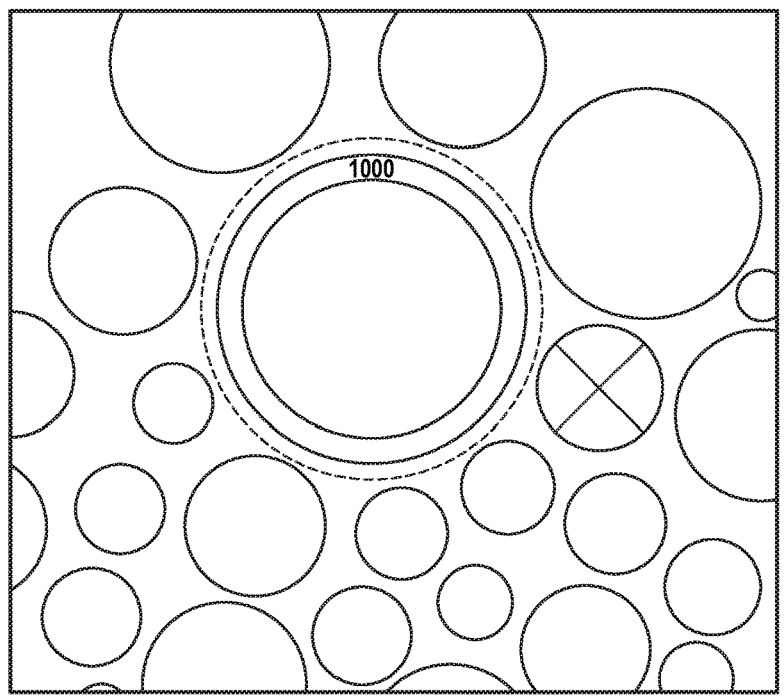
FIG. 6

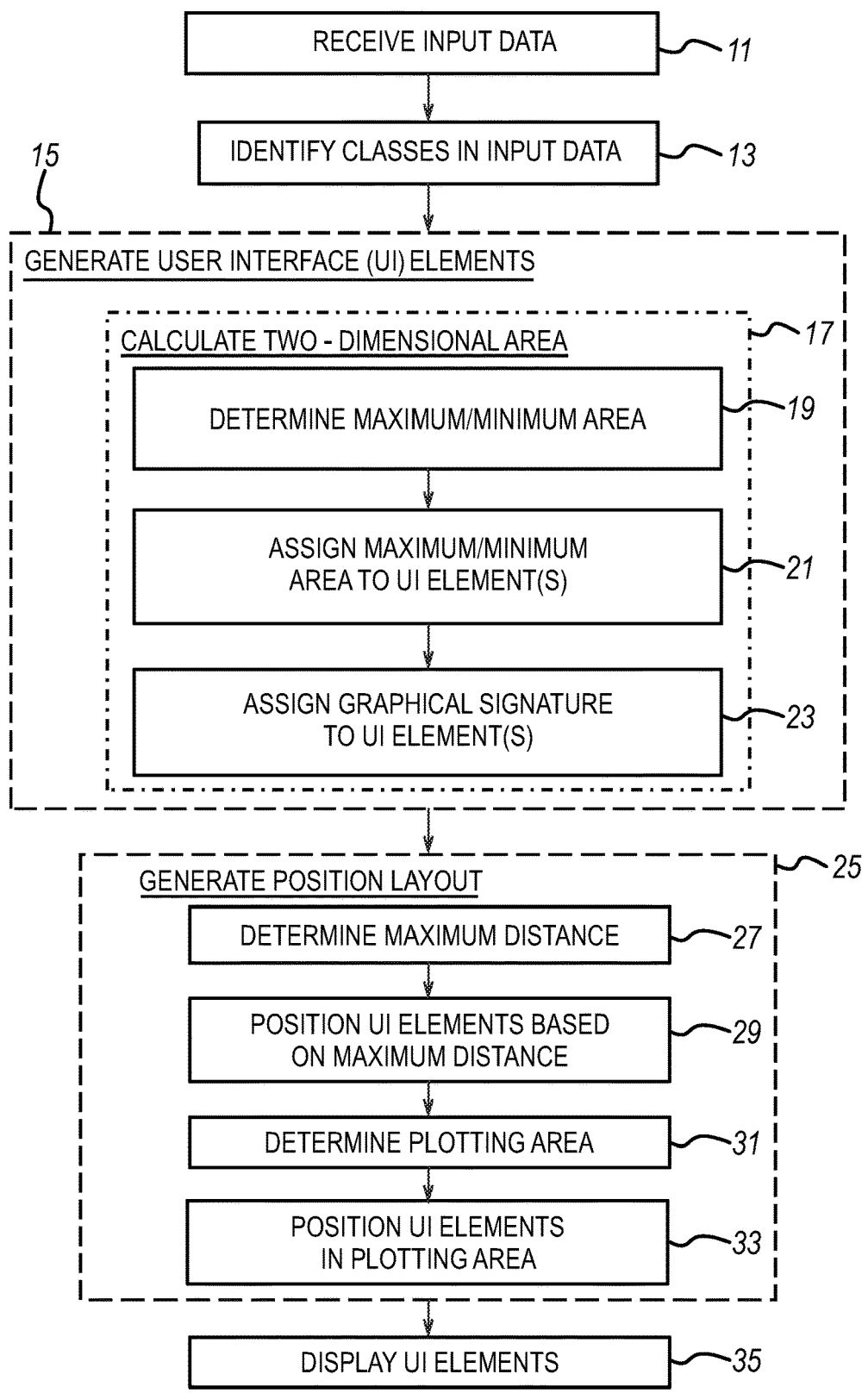

SYSTEM AND METHOD FOR GENERATING USER INTERFACE ELEMENTS

TECHNICAL FIELD

This disclosure relates to a system, a computer-implemented method and a computer program for generating user interface elements in order to make efficient use of display and processing resources.

BACKGROUND

There are many known techniques for displaying data to a user. In one example, data may be displayed in the form of a table comprising cells arranged into rows and columns, where numerical values are presented in each cell. Tables can be particularly useful when displaying data at a high level of detail. However, it can be difficult for users to establish general trends from data displayed in the form of tables. In particular, it can be difficult for users to read individual numerical values when a large number of cells are present, especially when a small display screen is used. This is especially relevant in modern environments where users tend to consume information using small display screens, such as those used for smart-phones.

In another example, data can be displayed using graphical techniques which tend to display fewer numerical values. For instance, a histogram, a bar chart, a pie chart or a line chart may be used where it is intended to illustrate general data trends, as opposed to many specific numerical values.

An example of a bar chart is illustrated in granted European patent EP 1 672 589. In a bar chart, a particular value associated with a discrete variable can be represented by the length of the bar. In this example, the length of the bar is defined relative to an axis which indicates a variable represented by the bar's length. In addition, the position of the bar is defined by another axis indicative of a discrete variable associated with the bar itself. Similarly, with pie charts the arc length of each slice in the chart is defined relative to a central axis, which is used to define the proportion of the whole that is attributed to each slice. Furthermore, the circumference of the pie chart may be considered as an axis which indicates the proportion attributed to each slice.

Each of the above-mentioned examples of data display techniques have drawbacks, when a large amount of data is displayed. Specifically, these techniques can be particularly problematic when a small display screen is used or when a large number of discrete variables or classes of data is displayed. In these cases, a user may find it difficult to recognise individual display elements. This can have serious consequences if incorrect inferences are drawn from data displayed.

In one example, a medical practitioner may wish to view the tumour sizes of a large number of different cancer patients. If the medical practitioner wishes to view the data for many different cancer patients at a particular time in order to quickly identify the most serious cases, then this would not be possible if a bar chart were used.

In another example, the medical practitioner may wish to view how the tumour sizes of the patients have varied over time. If bar chars were used for this purpose, then, the medical practitioner would be required to select many different charts for display one after another. This would be very time consuming and would require undesirable amounts of processing resources.

Thus, there exists a need for a technique that uses display resources more efficiently so that a user can visualise large quantities of data. In addition, there exists a need for a technique that allows data to be visualised in the time domain, whilst using processing resources in an efficient manner.

SUMMARY

This summary is provided to introduce a selection of concepts in a simplified form that are further described below in the detailed description section. This summary is not intended to identify only key or essential features of the claimed subject matter.

In one aspect of the invention there is provided a system for generating user interface elements comprising: a data analysis module arranged to identify a plurality of classes in input data, wherein each class is associated with at least one characteristic value; an element generation module arranged to generate a plurality of user interface elements each associated with a class by calculating, for each user interface element, at least one value indicative of a two-dimensional area based on the characteristic value associated with the class of the element; a positioning module arranged to generate a position layout by determining positions for the user interface elements, wherein each position is determined independently of an axis associated with a class or a variable relating to a class; and a display module arranged to display the plurality of user interface elements based on the position layout and the two-dimensional areas determined for each user interface element.

In another aspect of the invention there is provided a computer-implemented method of generating user interface elements comprising: identifying a plurality of classes in input data, wherein each class is associated with at least one characteristic value; generating a plurality of user interface elements each associated with a class by calculating, for each user interface element, at least one value indicative of a two-dimensional area based on the characteristic value associated with the class of the element; generating a position layout by determining positions for the user interface elements, wherein each position is determined independently of an axis associated with a class or a variable relating to a class; displaying the plurality of user interface elements based on the position layout and the two-dimensional areas determined for each user interface element.

In another aspect of the invention, there is provided a computer program comprising executable code portions which when run on a computer cause the computer to perform the methods described herein.

In another aspect of the invention, there is provided a computer-readable data carrier having stored thereon the computer program described herein.

BRIEF DESCRIPTION OF THE DRAWINGS

Various embodiments of the invention are be described below, by way of example only, with reference to the following drawings, in which:

FIG. 1 is a schematic of a system for generating user interface (UI) elements;

FIG. 2 is a flow chart illustrating a method for generating UI elements;

FIG. 6 is an enlarged view of a selection of some of the UI elements from FIG. 4;

DETAILED DESCRIPTION OF THE DRAWINGS

Figure 3:
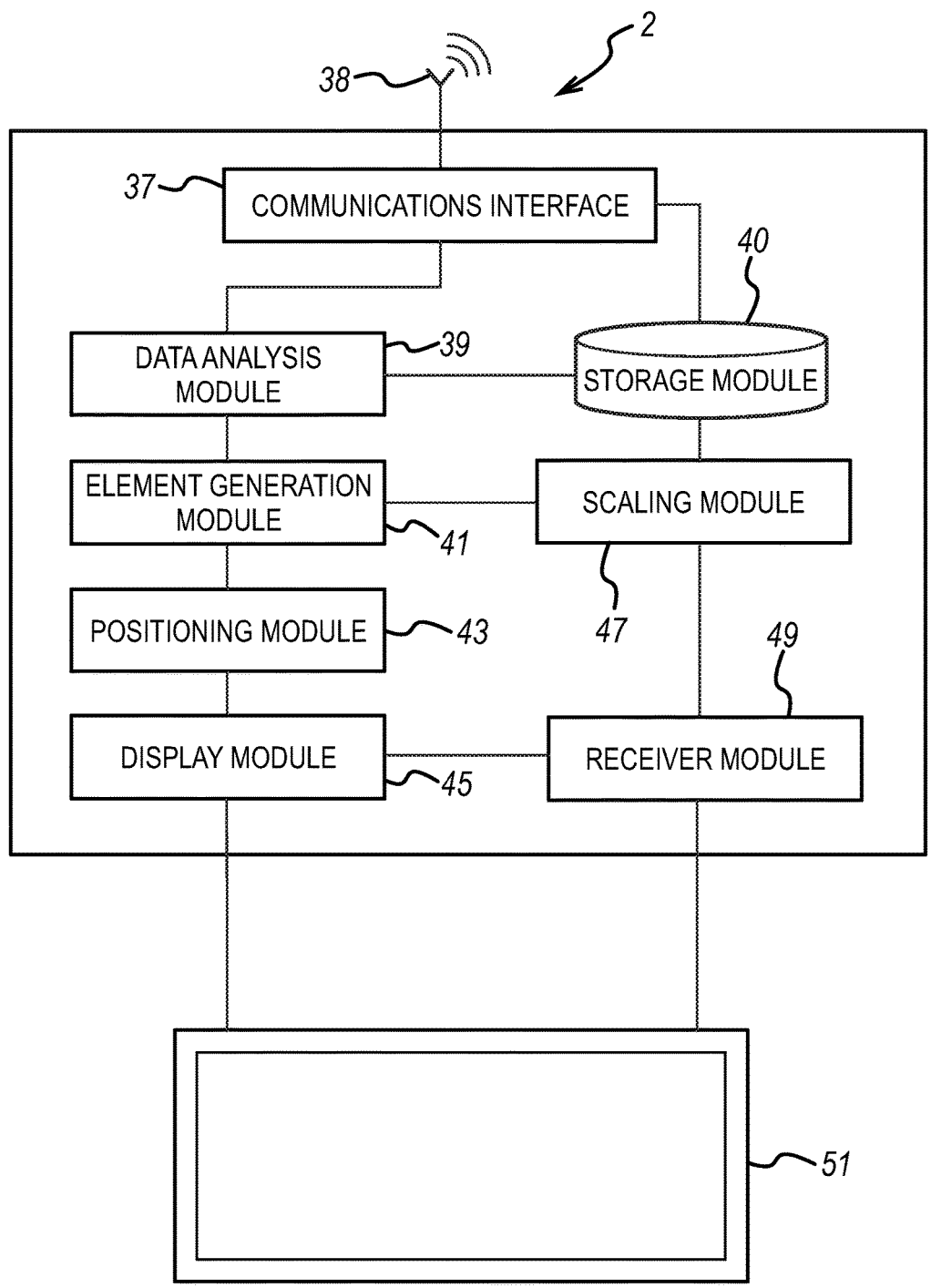
FIG. 3 is a schematic of some of the features of the system of FIG. 1.

Described herein are systems and methods for generating two-dimensional user interface (UI) elements each associated with a class identified in input data. The two-dimensional size of each UI element is determined by a characteristic value associated with the class of each respective UI element.

The UI elements are positioned for display independently of an axis associated with a class or a variable relating to a class. This allows each element to be positioned freely such that the space between elements can be minimised. Thus, it is possible to make more efficient use of display resources. In addition, the user will be able to visualise data more accurately, particularly when using a smaller screen because more display resources can be dedicated to displaying the data. In another example, each position is determined independently of a chart axis indicative of a reference guide representing a variable or a class.

Each UI element may comprise an arcuate shape. In this way, it is possible to tessellate the UI elements so that they can be positioned more closely together, thus making more efficient use of display resources. For instance, each UI element may have an ovular or a circular shape.

The UI elements may be positioned relative to one another in order to minimise the area between each element. In this way it is possible to avoid the presence of unused display area between elements, thus making more efficient use of display resources.

There may be a pre-determined maximum distance between each UI element. This maximum distance between each element sets a limit on the amount of display area that can remain unused. In this way, it is possible to define a cap on the amount of display resources that can be wasted.

There may be a maximum two-dimensional area for the UI elements, where this maximum area is assigned to UI elements associated with a characteristic value equal to or above a certain upper threshold. In this way, it is possible to avoid a situation in which elements with particularly large values, dwarf other elements, such that the user is not able to appreciate the size of the other elements.

A graphical signature may be assigned to UI elements having the maximum two-dimensional area. In this way, it is possible for the user to recognise which elements have been capped in size. This prevents the user from mistakenly assuming that an element's characteristic value is lower than displayed by its area.

The graphical signature may be indicative of the characteristic value which is equal to or above the threshold. In this way, it is possible for the user to determine the characteristic value of the element even though the value is not represented by the two-dimensional area of the element.

There may be a minimum two-dimensional area for the UI elements, where this minimum area is assigned to UI element associate with a characteristic value equal to or less than a certain lower threshold. In this way, it is possible to avoid a situation in which elements, which are associated with particularly small values, are unrecognisably small, such that the user is not able to appreciate the size of the other elements.

FIG. 1 illustrates the general architecture of a system 2 for generating and positioning two-dimensional UI elements, such that data can be displayed to a user in a more efficient manner. The system may comprise any number of computing devices, such as a desktop computer 1, a "tablet" computer 3, and a smartphone 5. The computing devices 1, 3 and 5 are arranged to communicate with one another and with a server 9, via a communications network 7.

The communications network 7, in this example, is the Internet 7. However, it will be appreciated that any suitable form of communications network 7 could be used.

The computing devices 1, 3, 5 are web-enabled by including an embedded browser or "app" or similar. In addition, each device 1, 3, 5 comprises a display, a UI, a processor and memory. The server 9 comprises a memory and a processor.

The devices 1, 3, 5 and the server 9 can be arranged to communicate data between one another via any suitable communications protocol or connection. For instance, the devices 1, 3, 5 and server 9 may communicate with one another via a wired and/or a wireless connection.

In the following example, each of the devices 1, 3, 5 may wish to view data stored at the server 9. This example data set comprises a large number of "classes" of data. The term class is used herein to refer to a particular entity, type or category of data. For instance, each class might signify a person, a particular location, such as country or town, or an institution, such as a company or a school etc.

Referring to FIG. 2, there is a method for operating the operating the system 2 shown in FIG. 1. FIG. 3 illustrates a schematic of some of the features of the system 2.

In step 11, input data is received at a communications interface 37 in the system 2. The input data comprises a plurality of classes data, and each class is associated with at least one characteristic value. The input data may be stored at a storage module 40 in the system 2.

In this example, the communications interface 37 has an antenna 38 for receiving input data via a wireless connection. However, the skilled person would appreciate that any suitable wired and/or wireless connection could be used for receiving input data.

In step 13, the input data is passed to a data analysis module 39, which analyses the input data in order to identify the classes. In addition, the input data is analysed in order to identify a characteristic value or characteristic values each associated with a respective class.

In this example, each class is indicative of a cancer patient, and each class has at least one associated characteristic value indicative of a tumour size of that patient. This particular data set is used for exemplary purposes only, and the skilled person would appreciate that the systems and method described herein could be used with any suitable input data set.

In step 15, the input data is passed to an element generation module 41, which is arranged to generate a plurality of user interface (UI) elements. In this step, each UI element is generated such that it is associated with one of the classes that were identified in step 13.

In step 15, the dimensions and/or attributes for the UI elements are calculated, before being displayed in step 35. However, an example of the UI elements, once displayed, is illustrated in FIG. 4 in order to provide context to the following explanation.

Figure 4:
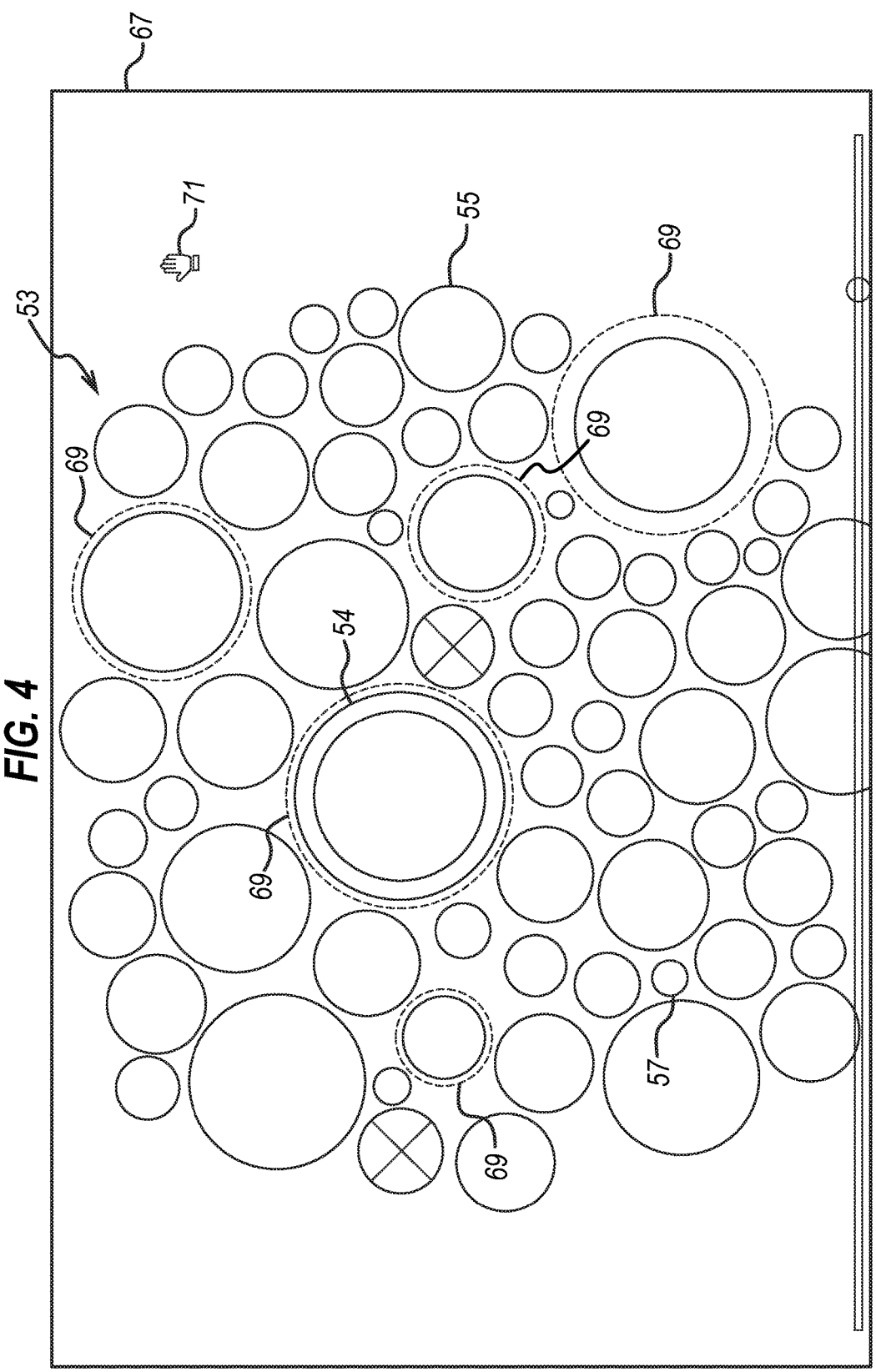
FIG. 4 illustrates an example of UI elements each associated with a class from input data.

Referring to FIG. 4, there is a cluster 53 of UI elements. The cluster 53 comprises UI elements 54, 55, 57 of various sizes. For instance, there is a first UI element 57, which has a relatively small size in comparison to the other UI elements. There is a second UI element 55, which has an average size relative to the other UI elements. There is a third UI element 54, which may be the largest in size, in comparison to the other UI elements.

In this example, the shape of each UI element in the cluster 53 may be described as arcuate. This allows the UI elements in the cluster 53 to be positioned closely to one another, in order to reduce unused space between the elements. Specifically, the shape of each UI element 54, 55, 57 in this example is circular. However, it will be appreciated that any other shape of UI elements could be used, such as an oval, a rectangular or a square shape.

In step 17, a two-dimensional area is determined for each UI element 54, 55, 57. This area is calculated based on the characteristic value associated with the class associated with the UI element for which the area is being determined. For instance, the patient associated with UI element 54 may have a tumour with a large size. In this situation, that patient's UI element will be large in comparison to the other UI elements in the cluster 53.

In determining the two-dimensional area for each UI element, the two-dimensional area may be calculated directly. For instance, the two-dimensional area for an element may be calculated as a specific value, such as a number in mm$^2$, or a specific number of pixels which constitute the UI element. Alternatively, the two-dimensional area may be calculated indirectly. For instance, the diameter, width, circumference, or radius may be calculated, which implicitly defines the two-dimensional area of the UI element. In both cases, at least one value indicative of a two-dimensional area is determined based on the characteristic value associated with the class of the element.

The two-dimensional area may be calculated based on a linear relationship between the characteristic value and the two-dimensional area. For instance, using the equation:

$$y = mx + c \qquad \text{[Equation 1]}$$

where:
y is the two-dimensional area for a UI element
x is the characteristic value for the UI element
m is a first constant, defining the gradient
c is a second constant, defining the y-intercept In step 19, a scaling module 47 in the system determines a maximum and/or a minimum two-dimensional area for the UI elements. The maximum and minimum two-dimensional area values may be predetermined. For instance, these values may be pre-loaded and stored at the storage module 40. The maximum two-dimensional area may be determined on the basis of the largest acceptable area for a UI element based on the typical size of a screen, while the minimum two-dimensional area may be determined on the basis of the smallest acceptable area for a UI element based on the typical size of a screen. In another example, the maximum and minimum areas may be dependent on the size of the display screen used by the user of the system upon which the UI elements are to be displayed.

Figure 7:
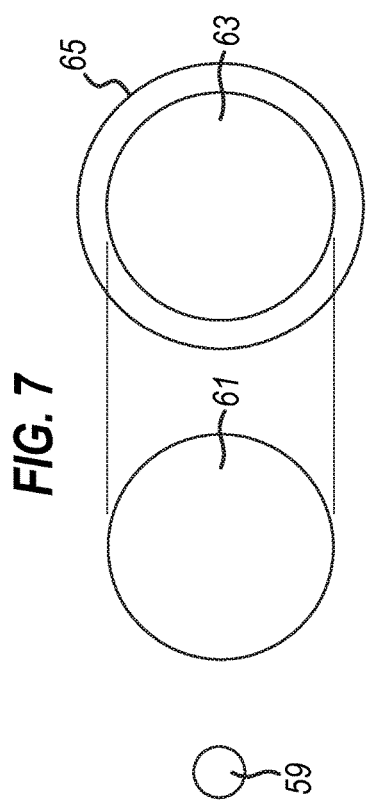
FIG. 7 illustrates an example of the maximum and minimum two-dimensional areas for the UI elements.

Referring to FIG. 7, there is a minimum-area UI element 59 and a maximum-area UI element 61. The two-dimensional area of the minimum-area UI element 59 is the minimum two-dimensional area defined in step 19. The two-dimensional area of the maximum-area UI element 59 is the maximum two-dimensional area defined in step 19.

There is also an alternative maximum-area UI element 63 which comprises an additional ring 65 around the maximum two-dimensional area. The additional two-dimensional area 65 is indicative of the area of the UI element 63 being capped at the maximum area. In this way, it is possible to prevent the user from confusing the UI elements that have been capped in size with the UI elements whose size is proportional to their characteristic value.

A label indicative of the characteristic value may be generated for display inside or in proximity to the ring 65. In this way it is possible to provide further data about the characteristic value associated with the maximum-area UI element 63. The label and/or the ring may be described as a graphical signature. However, the label and the ring are given as examples of graphical signatures and it will be appreciated that the graphical signature may take other forms. An example of a label is illustrated in FIG. 6, where the number "1000" is displayed within the ring. This indicates that the characteristic value of the UI element is equal to 1000, even though the size of the UI element has been capped at the maximum size.

The maximum two-dimensional area is associated with an upper threshold value, while the minimum two-dimensional area is associated with a lower threshold value. Therefore, if a characteristic value is greater than or equal to the upper threshold value, the UI element associated with that characteristic value will have the maximum two-dimensional area. On the other hand, if a characteristic value is less than or equal to the lower threshold value, the UI element associated with that characteristic value will have the minimum two-dimensional area.

Specifically, in step 21, the scaling module 47 identifies a class in the input data which is associated with a characteristic value which is equal to or greater than the upper threshold value. In addition, the scaling module 47 identifies a class in the input data which is associated with a characteristic value which is equal to or less than the lower threshold value. Then, the maximum two-dimensional area is assigned to the area of the UI element associated with the class associated with a characteristic value which is equal to or greater than the upper threshold value, and the minimum two-dimensional area is assigned to the area of the UI element associated with the class associated with a characteristic value which is equal to or less than the lower threshold value.

In step 23, the element generation module 41 is arranged to assign a graphical signature, as described above with reference to FIG. 6 and FIG. 7. In this step, the graphical signature is assigned to the user interface element of the class which is associated with a characteristic value which is equal to or greater than the upper threshold value.

As described above, UI elements associated with a class having a characteristic value equal to or less than the lower threshold value have the minimum two-dimensional area, and UI elements associated with a class having a characteristic value equal to or greater than upper threshold value have the maximum two-dimensional area. However, the UI elements associated with a class having a characteristic value between the upper and lower threshold are assigned a two-dimensional area based on a pre-determined relationship, such as the relationship defined in Equation 1.

Referring to FIG. 4, the largest UI element 54 has been assigned the maximum two-dimensional area, and the smallest UI element 57 has been assigned the minimum two-dimensional area. UI elements, such as UI element 55, whose size is in between the maximum and minimum, have their two-dimensional areas calculated in proportion to their associated characteristic value.

In step 25, a positioning module 43 generates a position layout for the UI elements. In this step, the position for each UI element is determined independently of an axis associated with a class or a variable relating to a class. The position for each element may be defined as a co-ordinate upon which the centre of each UI element is to be placed. However, any other suitable technique for defining the position of the UI element could be used.

Referring to FIG. 4, each UI element in the cluster 53 is distributed arbitrarily or 'randomly' relative to one another. In this example, the position of each user interface element is not indicative of a class or a variable associated with a class.

Since the position of each UI element is not indicative any particular meaning, it is possible to tessellate the UI elements in order to minimise any unused space between each UI element. Although the UI elements are positioned closely together, the positon layout is determined so that none of the UI elements overlap. This avoids UI elements from being obscured from display by other UI elements.

Steps 27-33 are sub-steps of step 25 in which the positions for the UI elements are determined. In step 27, the positioning module 43 determines a maximum distance. The maximum distance defines the largest distance that two adjacent UI elements can be positioned away from one another. This distance can be measured between the respective circumferences of each adjacent UI element. In step 29, the positioning module 43 positions each UI element relative to one another based on the maximum distance, so that there are no adjacent UI elements that are spaced apart further than the maximum distance. In this way, the maximum distance ensures that the UI elements are positioned closely together.

In step 31, the positioning module 43 identifies a plotting area 67, within which the UI elements are to be displayed, and the position of each UI element in the cluster 53 is within the plotting area 67. In step 33, once the plotting area 67 is determined the positioning module 43 determines each user interface element position based on an axis of the plotting area 57, such as the horizontal or vertical axis of the plotting area 57. However, in this case the UI elements are positioned independently of another axis, which is different from the axis of the plotting area 57.

In step 35, the UI elements are displayed based on the two-dimensional areas determined in step 15. Further, the UI elements are displayed in accordance with the position layout determined in step 25. In this step, a display module 45 causes the UI elements to be displayed on a display screen 51 in a cluster 53, such as the example described with reference to FIG. 4.

As described above, in step 15 the two-dimensional area of each UI element is determined. However, this step may involve determining other characteristics and attributes for the UI elements. In one example, each class in the input data may be associated with a category of data. For instance, where the input data relates to the tumour size of cancer patients, each patient may be categorised by their gender. Thus, each patient may be associated with a category referred to as "male" or a category referred to as "female". In this case, the element generation module 41 associates each category with a formatting scheme. For instance, the "male" category may be associated with the colour purple, while the female category may be associated with the colour grey. Thus, the element generation module 41 is able to assign alter the appearance of each UI element depending on the category associated with the class of each UI element. Although in this example different colours have been used to create different formatting schemes, other suitable formatting schemes could be used, such as altering the shading or shape of the UI elements depending on their associated category. For instance, a particular category of data may be represented by a cross though the UI element, as illustrated in FIG. 4, FIG. 5 and FIG. 6.

Determining the attributes of the UI elements in step 15 can also be used in order to display predictions regarding the input data to the user. For instance, the storage module 40 may have stored predicted future characteristic values for at least some of the classes in the input data. For example, the storage module 40 may have predicted the future tumour size of a selection of the patients in the input data set. In this case, the element generation module 41 can identify a predicted value associated with a class. Then, the element generation module 41 may modify the two-dimensional area of a UI element in order to show the predicted characteristic value. This is illustrated by the dotted rings 69 illustrated in FIG. 4. These rings show the predicted increase in value of the characteristic value of some of the UI elements. In this example, the two-dimensional area of the inside of each ring is calculated in using the linear relationship discussed above, and the UI elements are positioned such that the rings do not overlap with neighbouring UI elements. Thus, the dotted rings 69 form an additional two-dimensional area based on the predicted value, and the display module 45 displays the additional two-dimensional area for each selected UI element. The visual appearance of the dotted rings 69 may be different to the main body of the UI elements.

Referring to FIG. 3, the system 2 comprises a receiver module 49 which can receive inputs from a user, so that the user can interact with the UI elements displayed. In this example, the receiver module 49 is arranged to receive user inputs from a touch-screen display 51. However, any other suitable form of user input device could be used, such as a mouse, keyboard etc.

Figure 5:
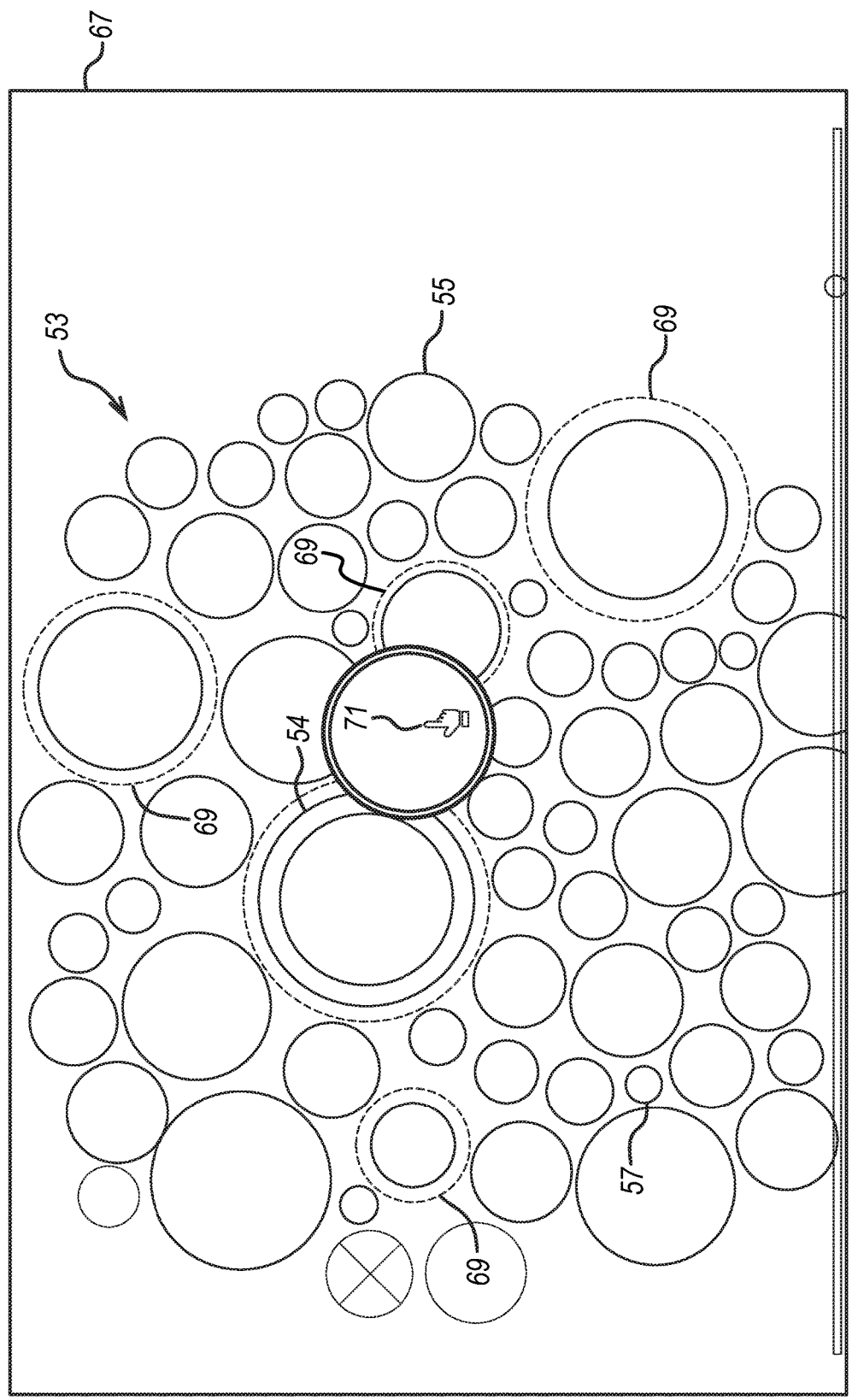
FIG. 5 illustrates an example of a user interaction with the UI elements.

The cursor 71 in FIGS. 4 and 5 illustrates the position of a touch-gesture initiated by the user via the touch-screen display 51. Each UI element displayed is arranged to respond to an interaction from a user. For example, the user is able to initiate a touch gesture in the location of largest UI element 54 in order to select the UI element 54. In response to the user selecting the UI element, further information relating to the class associated with the selected user interface element is displayed. For instance, selecting a UI element may cause a detailed view of a patient's medical records to be displayed, where that patient is associated with the selected UI element.

The user is able to move the UI elements. For instance, the user may select the UI element 54 by initiating a touch gesture in the location of the UI element 54. Then, the user can move or 'drag' their finger across the touch-screen display 51 in order to move the UI element 54 from a first position to a second position. These two positions and the movement of the UI element 54 are illustrated in FIGS. 4 and 5.

The user is able to move a UI element in order to initiate an action in connection with the UI element being moved.

For instance, the user can move a UI element into a position on the screen which causes further detail to be shown in association with the class of the UI element that was moved. In one example, there may be a designated area of the screen into which UI elements can be moved in order to compare at least one characteristic associated with the UI elements that have been moved into the designated area. The designated area may be in the form of a "bar" shaped UI element (or in other words a "compare bar"). When UI elements are moved onto the compare bar, this creates a group of the UI elements that have been moved onto the compare bar. Then, information may be displayed illustrating a comparison of a characteristic or characteristics associated with the class of each of the UI elements in the group. The characteristic or characteristics may be user selected. In another example, the user can move a first UI element onto the location of or in proximity to a second UI elements in order to initiate an averaging function to be performed in respect of characteristic values of the two classes associated with the UI elements. For example, a user may move a first UI element associated with a first patient over the top of a second UI element associated with a second patient. In response to this repositioning, the display module 45 may generate an average of the tumour sizes of the first and second patients for display. More than two UI elements may be moved onto one another in order to increase the number of class characteristics being averaged. The characteristic (or characteristics) to be averaged may be user selected.

Each class in the input data may be associated with continuous or discrete data. An example of discrete data would be the gender of each patient, while an example of continuous data would be the tumour size of each patient. The receiver module 49 may be arranged to receive a filtering instruction from the user. This filtering instruction may include a user's selection of which patients are of interest.

The user may be interested in the tumour size of the male patients. In this case, the user initiates a filtering instruction via touch-screen display 51, where the instruction specifies male patients. In response, the display module 45 may remove the UI elements associated with the female patients from the display.

Figure 8:
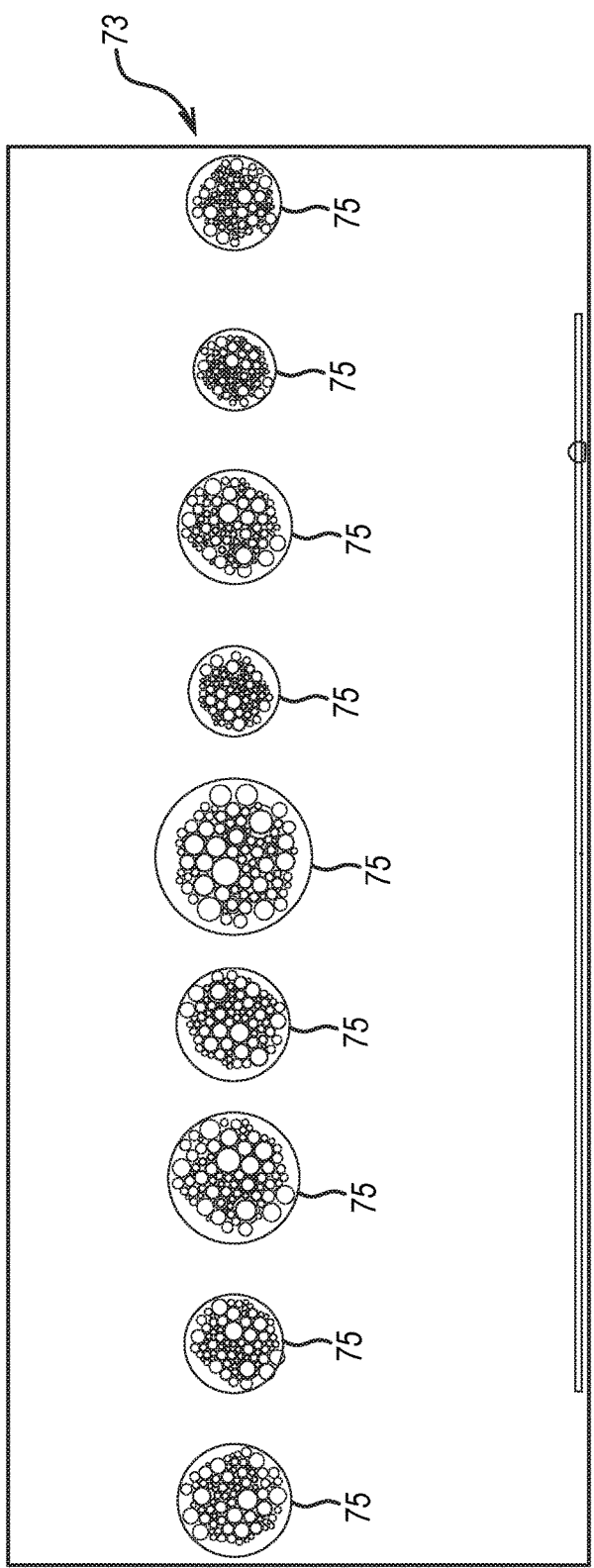
FIG. 8 illustrates UI elements that have been filtered into separate clusters.

In another example, the user may be interested in the tumour sizes of patients of different nationalities. In this case, the user initiates another filtering instruction via the touch-screen 51, where the filtering instruction specifies nationality. In response, the display module 45 repositions the UI elements so that they are grouped into their respective categories. An example of the response to the filtering instruction is illustrated in the screenshot 73 of FIG. 8. In the screenshot 73 the UI elements have been grouped into a plurality of clusters 75, where each cluster 75 includes the UI elements of a particular category of data based on the filtering instruction. In this case, the UI elements are grouped into clusters 75 dependent on the nationality of each patient associated with each UI element. Each cluster is able to respond to a user interaction so that the user can select a particular cluster of interest. For instance, the user may select one cluster 75 in order to enlarge the UI elements of that cluster and to hide the remaining unselected clusters 75.

The UI elements may be animated when repositioned or removed in response to a user initiating a filtering instruction. In this way, it is easier for the user to track which particular UI elements have been repositioned or removed in response to the filtering instruction.

The systems and method described above enable data to be displayed in an efficient manner where there is a large number of classes within the input data. However, there may be cases where the size of the display screen is limited or where the number of UI elements is too large for the respective sizes of the UI elements to be appreciated.

Figure 9:
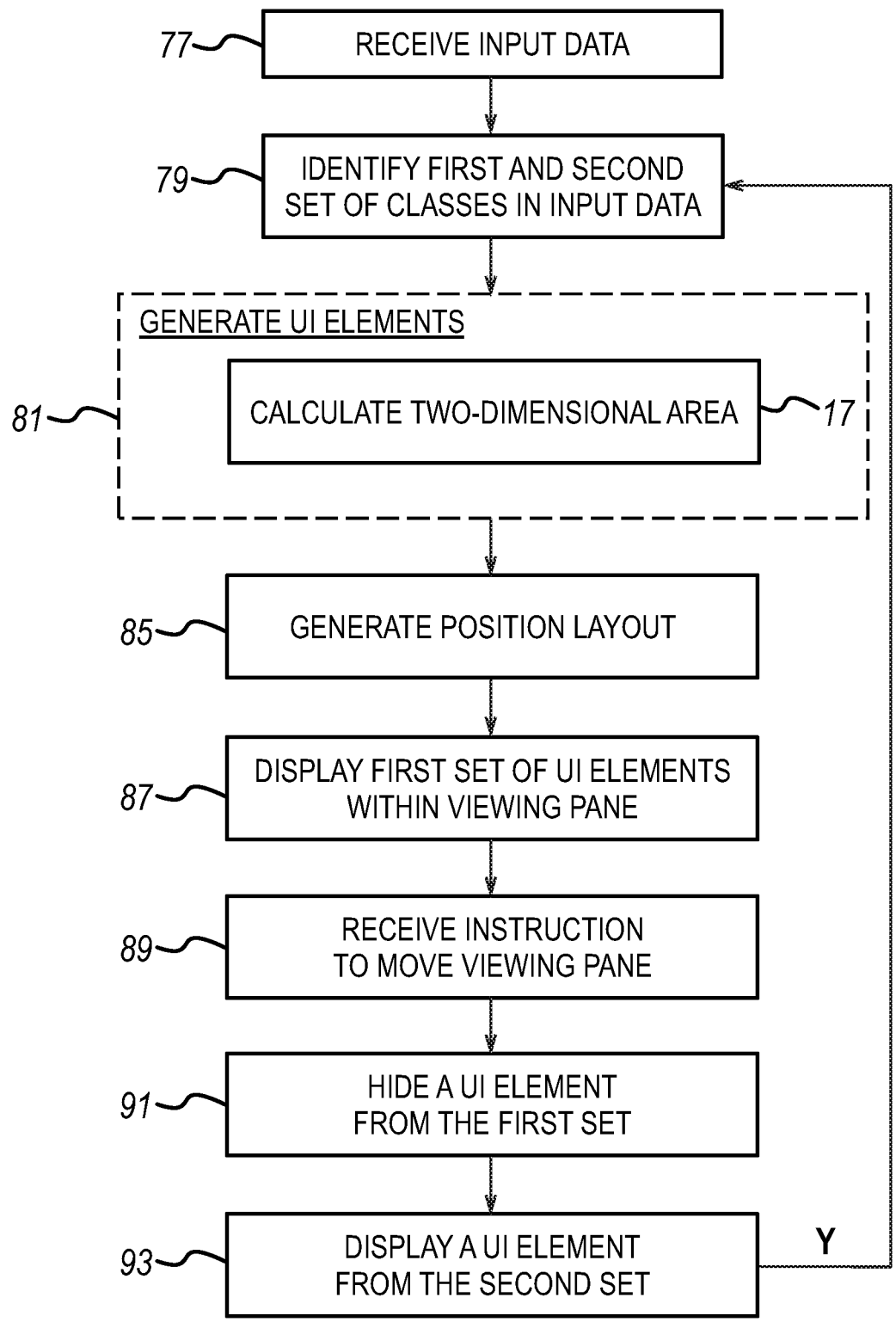
FIG. 9 is a flow chart illustrating a method for a navigating through a plurality of UI elements.

A method is described below, with reference to FIG. 9, which alleviates at least some of the challenges encountered in these situations. For instance, where the number of UI elements to be displayed is too large, this may result in an undesirable processing load on the system.

In step 77, input data is received at a communications interface 37 in the system 2. This step is executed in a similar manner to that described above with reference to step 11.

In step 79, the data analysis module 39 determines a first threshold, which defines the maximum number of UI elements that are to be displayed. Then, a first set of classes is identified, so that the number of classes in the first set is equal to or less than the first threshold.

In step 79, the data analysis module 39 determines a second threshold, which defines the maximum number of UI elements that are to be generated but not displayed. Then, a second set of classes is identified, so that the number of classes in the second set is equal to or less than the second threshold. The second set of classes comprises a selection of some of the remaining classes in the input data that are not in the first set.

Thus, in step 79 the classes in the input data are grouped into three sets: the first set for which UI elements are to be displayed, the second set for which UI elements are not to be displayed and a third set which comprises the remaining classes.

The maximum number may be pre-determined and stored at the storage module. For example, the maximum number of UI elements may be pre-set to equal 100. The maximum number of classes may be variable depending on a range of factors. For instance, the maximum number may be calculated based on the size of display screen, the size of the UI elements to be displayed or the speed of the processor being used. In this way, the maximum number may be increased for large display screens and faster processors, but decreased for smaller display screens and slower processors. Thus, the maximum number of UI elements can be optimised depending on the specific hardware that is being used by the system at a particular time.

In step 81, UI elements are generated for the classes in the first and the second set of classes. These UI elements are generated in a similar manner to that described above with reference to step 17. Thus, in step 81 UI elements are generated for the classes in the first set and the second set. However, no UI elements are generated at this stage for the remaining classes. In this way, only a limited number of UI elements are generated, rather than generating UI elements for all of the classes. This allows processing resources can be conserved.

In step 85, a position layout is generated for the UI elements associated with classes in the first set and the second set. This positon layout is generated in a similar manner to that described above with reference to step 25.

In step 87, the UI elements for the first set only are displayed based on the two-dimensional areas and attributes determined in step 81. Further, the UI elements of the first set only are displayed in accordance with the position layout determined in step 85. In this step, a display module 45 causes the UI elements to be displayed on a display screen 51 in a cluster 103 within a viewing pane 97.

Figure 10:
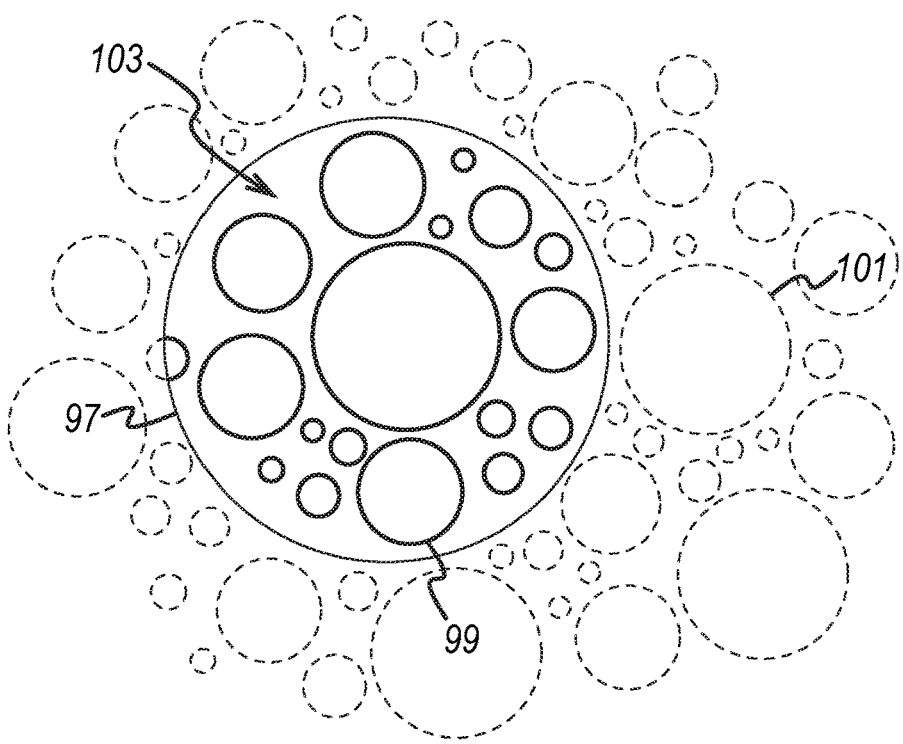
FIG. 10 illustrates a first display produced by the method of FIG. 9.

An example of the display of the first set of UI elements is illustrated in FIG. 10. The UI elements that are represented by the solid lines, such as UI element 99, are displayed to the user. These are the UI elements associated with the classes in the first set of classes. The UI elements represented by the dashed lines, such as UI element 101, are not displayed to the user but the dimensions/attributes for these UI elements were calculated in step 81. These are the UI elements associated with the classes in the second set of classes. Thus, display resources can be used more efficiently by only displaying the classes of the first set.

Figure 11:
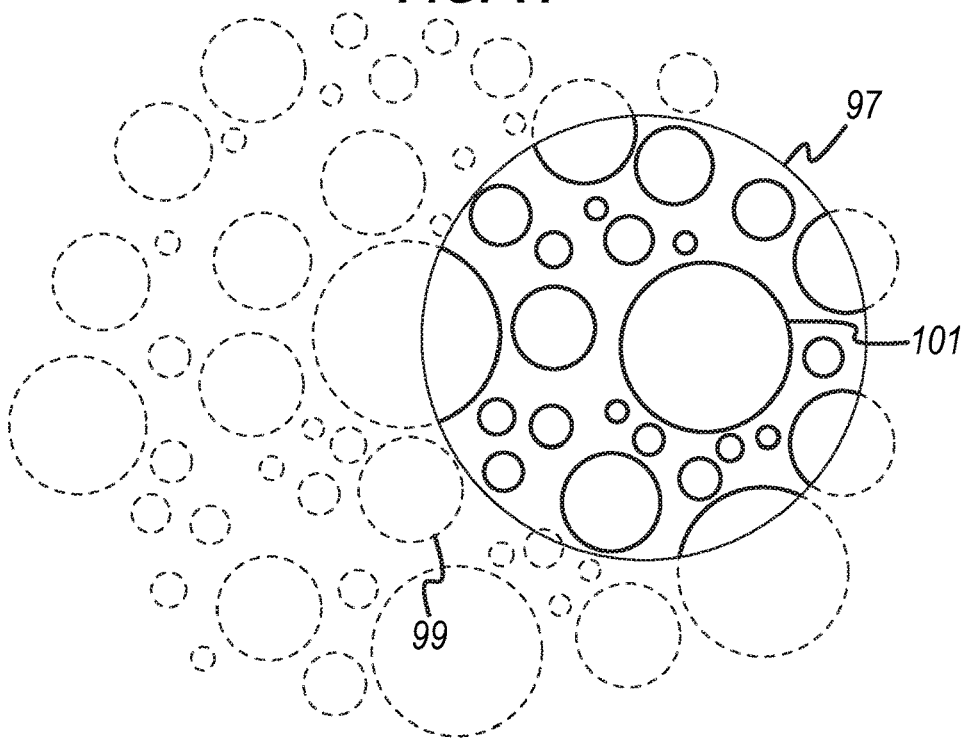
FIG. 11 illustrates a second display produced by the method of FIG. 9.

In step 89, the receiver module 49 receives an instruction to move the viewing pane relative to the UI elements. For example, this instruction may be input via the user dragging their finger across the touch-screen display 51. FIGS. 10-11 illustrate the response to the user's instruction, in which it can be seen that the moveable viewing pane 97 has been translated from left to right. This repositioning of the viewing pane relative to the UI elements may be cause by the user dragging their finger from a left-hand side to a right-hand side of the touch-screen display 51.

In step 91, the movement of the viewing pane 97 causes at least one of the UI elements from the first set to be hidden. In the example illustrated in FIGS. 10-11, the UI element 99 (amongst other UI elements) becomes hidden from view, or in other words "disappears" from the display screen 51.

In step 93 (which may occur simultaneously with step 91) the movement of the viewing pane 97 causes at least one of the UI elements from the second set to become displayed. In the example illustrated in FIGS. 10-11, the UI element 101 (amongst other UI elements) becomes visible, or in other words "appears" on the display screen 51.

As described above, the instruction to move the viewing pane comprises a direction, such as left to right when the user moves their finger from left to right across the touch-screen display 51. In this case, the receiver module 49 causes the display module 51 to display at least one UI element of the second set adjacent to an edge portion of the viewing pane corresponding with the direction of the instruction, in response to receiving the instruction to move the viewing pane. Thus, in the example where the direction is towards the right-hand side, a UI element of the second set will appear adjacent a right-hand edge portion of the viewing pane 97.

In addition, the receiver module 49 may cause the display module 51 to hide at least one UI element of the first set at an edge portion of the viewing pane 97 corresponding with the an opposite direction to the direction of the instruction, in response to receiving the instruction to move the viewing pane 97. Thus, in the example where the direction is towards the right-hand side, a UI element of the second set will appear adjacent a left-hand edge portion of the viewing pane 97.

After step 93, the method may return to step 79 in which the first and second set of classes are identified. In this case, the classes in the first set are the classes associated with the UI elements that are currently being displayed in the viewing pane 97. The second set of the classes are the classes for which UI elements are to be generated but not displayed.

Identifying the second set of classes may comprise predicting which classes a user is likely to be interested in. In this way, it is possible for the system to generate UI elements for the classes which the user is most likely to wish to view next. The prediction may be based on pre-defined user preferences or past behaviour of the user interacting with the UI elements. For instance, the user may have a history of viewing data relating to a particular UI element more than others. In this case, the more 'popular' classes of data are grouped into the second set of classes.

The above method allows the user to selectively display sub-clusters of UI elements within a cluster of UI elements that are not displayed. However, it is desirable for the user to be able to understand the position of the sub-cluster with respect to the larger cluster. This will prevent the user becoming 'lost' within the overall cluster of UI elements. In order to assist the user in navigating through the UI elements the display module 45 may display a map on the display screen 51. This map shows a plurality of "dummy elements", which are displayed to mimic the positions of the UI elements in the cluster without accurately displaying the size and other attributes of the UI elements that were determined as described with reference to steps 81 and 17. In particular, the values indicative of two-dimensional areas for each dummy element are not calculated based on a characteristic value associated with a class. Instead of calculating the two-dimensional areas for the element based on the characteristic values, arbitrary, random or uniform two-dimensional areas are selected for each of the dummy elements. This reduces the processing power required in producing the map of dummy elements.

The map displays the dummy elements in relation to an element indicative of the position of the viewing pane relative to the elements. In this way, it is possible for the system to help the user navigate without requiring the processing resources needed in order to display the cluster of UI elements with their proper dimensions and attributes.

In another example, the input data may comprise a plurality of classes each associated with a plurality of characteristic values. Each of the plurality of characteristic values may be associated with a corresponding time stamp. For instance, the input data may comprise data relating to the tumour size of a collection of patients, where tumour size measurements for each patient are associated with the date upon which the measurement was taken.

Figure 12:
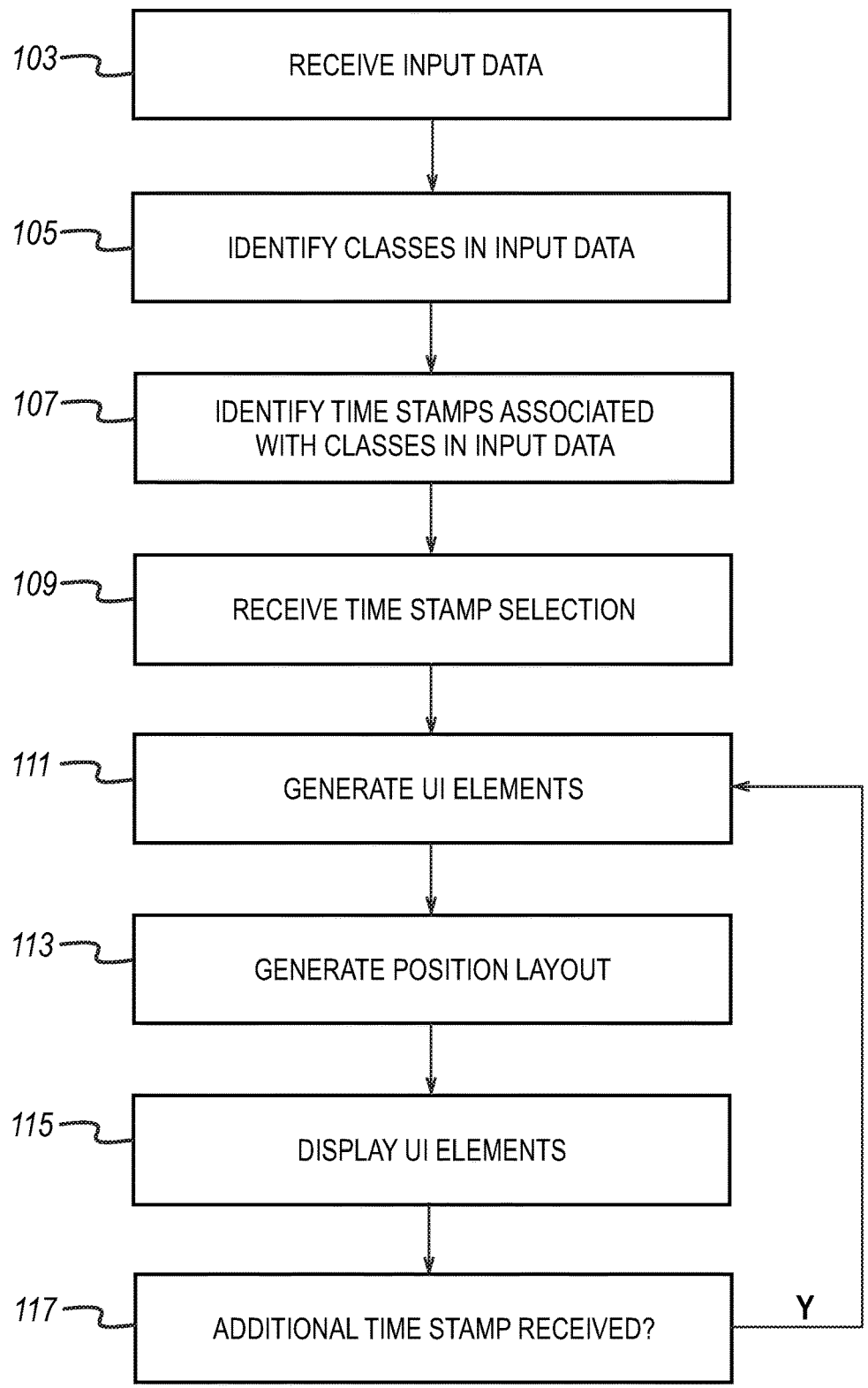
FIG. 12 is a flow chart illustrating a method for displaying data associated with a selected time stamp.

Referring to FIG. 12, there is a method for operating the operating the system 2 shown in FIGS. 1 and 3 so that the values associated with different times can be interrogated more easily by the user.

In step 103, input data is received at a communications interface 37 in the system 2. This step is executed in a similar manner to that described above with reference to step 11.

In step 105, the input data is passed to a data analysis module 39, which analyses the input data in order to identify the classes and characteristic values each associated with a respective class. This step is executed in a similar manner to that described above with reference to step 13.

In step 107 the data analysis module 39 identifies the time stamps in the input data corresponding with each characteristic value, which in turn are associated with a respective class.

In step 109, a first time stamp selection is received. Initially, this time stamp selection may be a default time stamp, such as the current date/time. Alternatively, the earliest time stamp in the input data may be automatically selected. In another example, the user may be prompted via the touch-screen display 51 to provide a time stamp selection. In response to the time stamp selection, the data analysis module 39 determines which characteristic values are associated with the first time stamp. It is these characteristic values and their associated classes that will be used to generate the UI elements.

In step 111, the UI elements are generated in a similar manner to that descried above with reference to step 15. However, in this case the two-dimensional area and attributes for each UI element is determined based on the characteristic values associated with the selected time stamp.

In step 113, a position layout for the UI elements is determined in a similar manner as described above with reference to step 25.

In step 115, the UI elements are displayed based on the two-dimensional areas and positions determined in steps 111 and 113. Step 115 may be executed in a similar manner to that described above with reference to step 35.

Figure 13:
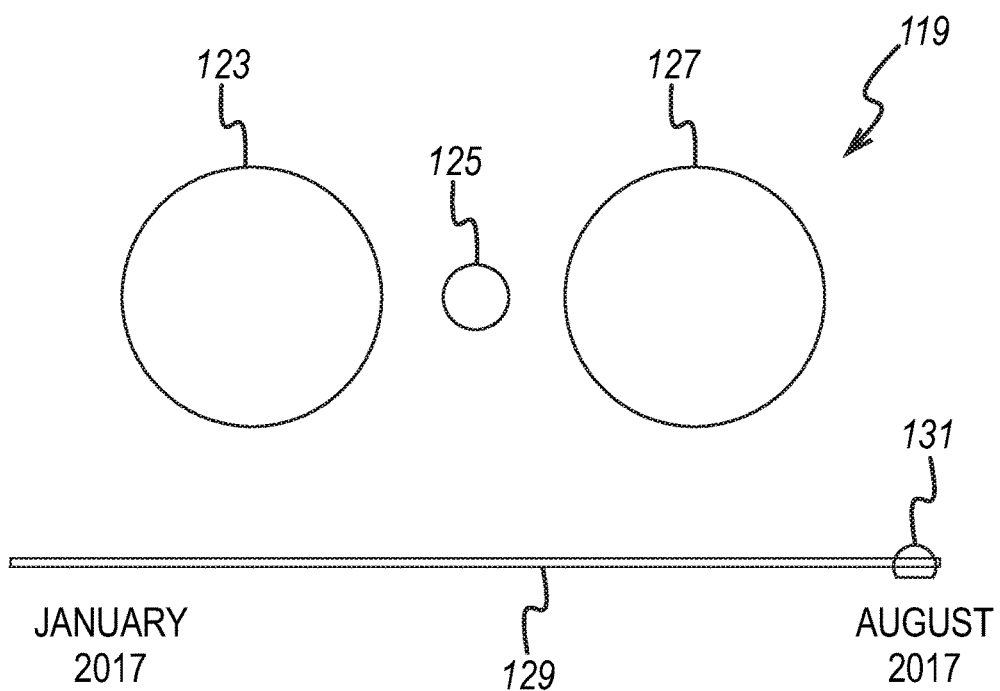
FIG. 13 illustrates the display produced by the method of FIG. 12 for a first time stamp.

Referring to FIG. 13, there is a screenshot 119 of an example of the display as produced in step 115. In this example, there are only three UI elements 123, 125, 127 shown for ease of explanation. Each one of the three UI elements 123, 125, 127 is associated with a class, and the two-dimensional area of each UI element 123, 125, 127 is indicative of a characteristic value associated with each respective class. To carry forward the example used above, each UI element 123, 125, 127 is associated with a cancer patient, and the size of the UI element is indicative of that patient's tumour.

In addition, there is a slider 129 with a selector 131 indicating the time stamp that has been selected. The slider 129 is used here as an example as a means for adjusting the time stamp. However, the time stamp could be adjusted in other ways. For instance, the user may be presented with a filed into which the time stamp may be input via a keyboard.

In generating the slider 129, the data analysis module 39 may determine a maximum time stamp and a minimum time stamp in the input data, defining a range of time stamps. Then, the slider 129 may display the range of time stamps for selection by the user with the maximum time stamp indicated at one end of the slider 129, and the minimum time stamp at the other end of the slider. The user can then reposition the selector 131 on the slider 129 in order to select different time stamps within the range.

In the example illustrated in FIG. 13, the time stamp has been set to the date "August 2017" by default. Thus, the UI elements in the screenshot 119 illustrate the size of three different patients during "August 2017".

In step 117, a different time stamp can be selected in order to show the characteristic values of the classes at a different point in time. For instance, the user may wish to view the tumour sizes of the patients at an earlier point in the year, such as "April 2017". In order to do this, the user interacts with the selector 131, via a touch input or another input means, and moves the selector 131 along the slider 129 towards the location of the preferred time stamp. The relocation of the selector 131 is illustrated in the screenshot 121 of FIG. 14.

Once this additional time stamp has been selected, steps 111 to 115 are repeated in a similar manner to that described above. However, in this case the time stamp selected in step 117 ("April 2017") is used to generate the size of the UI elements.

Figure 14:
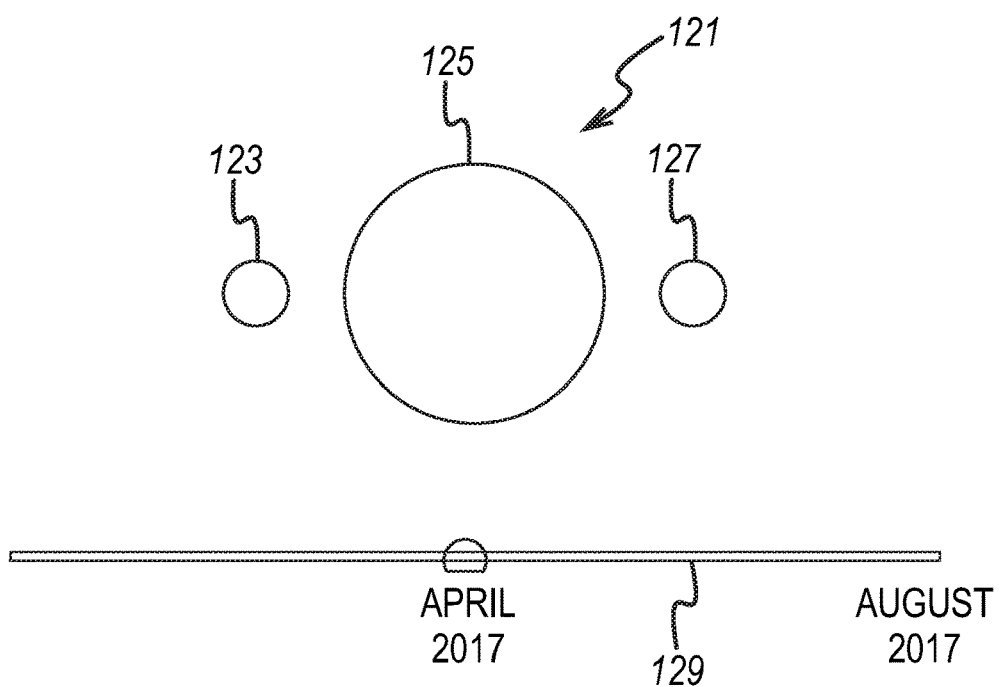
FIG. 14 illustrates the display produced by the method of FIG. 12 for a second time stamp.

FIG. 14 illustrates a screenshot showing the UI elements 123, 125, 127 that have been altered based on the new selection of the time stamp. When the time stamp is changes and the two-dimensional areas of the UI elements change, the display module 45 may animate the UI elements in order to show the UI elements 'shrinking' or 'growing' depending upon whether the characteristic values have decreased or increased with the change in the time stamp.

The term "comprising" encompasses "including" as well as "consisting" e.g. a composition "comprising" X may consist exclusively of X or may include something additional e.g. X+Y. Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system. For instance, the modules and components illustrated in FIG. 3 may be located at any of the devices 1, 3, 5 or server 9 in FIG. 1. Alternatively, some of the modules and components may be located at a device 1, 3, 5, while the others are located at the server 9 or distributed across a plurality of different servers.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

EMBODIMENTS

1. A system for generating user interface elements comprising:
a data analysis module arranged to identify a plurality of classes in input data, wherein each class is associated with at least one characteristic value;
an element generation module arranged to generate a plurality of user interface elements each associated with a class by calculating, for each user interface element, at least one value indicative of a two-dimensional area based on the characteristic value associated with the class of the element;
a positioning module arranged to generate a position layout by determining positions for the user interface elements, wherein each position is determined independently of an axis associated with a class or a variable relating to a class; and
a display module arranged to display the plurality of user interface elements based on the position layout and the two-dimensional areas determined for each user interface element.

2. The system of embodiment 1 wherein each user interface element comprises an arcuate shape.

3. The system of embodiment 1 or embodiment 2 wherein the positioning module is arranged to determine each position for the user interface elements by positioning the user interface elements relative to one another in order to minimise the area between each element.

4. The system of any preceding embodiment wherein the positioning module is arranged to position the user interface elements relative to one another, such that each user interface element does not overlap with an adjacent user interface element.

5. The system of any preceding embodiment wherein the positioning module is arranged to determine each position for the user interface elements by positioning the user interface elements relative to one another with a maximum distance between each user interface element.

6. The system of any preceding embodiment wherein the position of each user interface element is not indicative of a class or a variable associated with a class.

7. The system of any preceding embodiment wherein the positioning module is arranged to identify a plotting area within which the user interface elements are to be positioned, wherein each user interface element position is within the plotting area.

8. The system of embodiment 7 wherein the positioning module is arranged to determine each user interface element position based on an axis of the plotting area, and independently of another axis, different from the axis of the plotting area, indicative of a variable associated with a class.

9. The system of any preceding embodiment further comprising a scaling module arranged to:
determine a maximum two-dimensional area for the user interface elements, wherein the maximum two-dimensional area is associated with an upper threshold value;
identify a class associated with a characteristic value which is equal to or greater than the upper threshold value; and
assign the maximum two-dimensional area to the area of the user interface element associated with the class associated with a characteristic value which is equal to or greater than the upper threshold value.

10. The system of embodiment 9 wherein the element generation module is arranged to assign a graphical signature to the user interface element associated with the class associated with a characteristic value which is equal to or greater than the upper threshold value.

11. The system of embodiment 10 wherein the graphical signature is indicative of the characteristic value which is equal to or greater than the upper threshold value.

12. The system of any preceding embodiment further comprising a scaling module arranged to:
determine a minimum two-dimensional area for the user interface elements, wherein the minimum two-dimensional area is associated with a lower threshold value;
identify a class associated with a characteristic value which is equal to or lower than the lower threshold value; and
assign the minimum two-dimensional area to the area of the user interface element associated with the class associated with a characteristic value which is equal to or lower than the lower threshold value.

13. The system of any preceding embodiment further comprising a scaling module arranged to:
determine a maximum two-dimensional area for the user interface elements, wherein the maximum two-dimensional area is associated with an upper threshold value;
determine a minimum two-dimensional area for the user interface elements, wherein the minimum two-dimensional area is associated with a lower threshold value; and
assign a two-dimensional area to the area of the user interface element associated with a class which is greater than the lower threshold value and lower than the upper threshold value, based on a pre-determined relationship.

14. The system of embodiment 13 wherein the pre-determined relationship is a linear relationship between the characteristic value and the size of the two-dimensional area.

15. The system of any preceding embodiment wherein each class is associated with a category and each category is associated with a formatting scheme;
wherein the appearance of each user interface element is defined by the formatting scheme associated with the category of each respective class.

16. The system of embodiment 15 wherein the formatting scheme defines a colour for a user interface element.

17. The system of any preceding embodiment wherein the element generation module is arranged to:
identify a predicted value associated with each class; and
modify a user interface element based on the predicted value of the class associated with the user interface element.

18. The system of embodiment 17 wherein the element generation module is arranged to generate an additional two-dimensional area based on the predicted value; and
the display module is arranged to display the additional two-dimensional area.

19. The system of any preceding embodiment wherein each user interface element is associated with continuous or discrete data, and the system further comprises:

a receiver module arranged to receive a filtering instruction of continuous or discrete data;

wherein the display module is arranged to remove or reposition at least one user interface element from being displayed in response to the filtering instruction.

20. The system of embodiment 19 wherein removing or repositioning at least one user interface element from being displayed in response to the filtering instruction comprises:

animating the at least one user interface element to reposition the user interface element of remove the use interface element from being displayed.

21. The system of any preceding embodiment wherein each class is associated with a plurality of characteristic values each with a corresponding time stamp.

22. The system of embodiment 21 further comprising a receiver module arranged to receive a selection of a first time stamp;

wherein the data analysis module is arranged to determine a first selection of characteristic values each associated with the first time stamp; and the element generation module is arranged to generate the plurality of two-dimensional user interface elements for each class by determining a two-dimensional area for each user interface element based on each characteristic value from the first selection.

23. The system of embodiment 22 wherein the receiver module is arranged to receive a selection of a second time stamp;

the data analysis module is arranged to determine a second selection of characteristic values each associated with the selected second time stamp; and the element generator module is arranged to modify the plurality of two-dimensional user interface element for each class, by adjusting the two-dimensional area for each user interface element based on each characteristic value from the second selection.

24. The system of embodiment 23 wherein adjusting the two-dimensional area for each element comprises:

animating each user interface element from a two-dimensional area for a first characteristic value to have an adjusted two-dimensional area for a second characteristic value.

25. The system of any one of embodiments 23 to 24 wherein the display module is arranged to display a time stamp adjusting element arranged to allow the user select a time stamp.

26. The system of any one of embodiments 22 to 25 wherein the data analysis module is arranged to determine a maximum time stamp and a minimum time stamp in the input data, defining a range of time stamps, wherein the time stamp adjusting element displays the range of time stamps for selection by the user.

27. The system of any one of embodiments 22 to 26 wherein the time stamp adjusting element is arranged to allow the user to select a plurality of time stamps within the range.

28. The system of any preceding embodiment wherein the data analysis module is arranged to identify a first set of classes and a second set of classes in the plurality of classes;

wherein the element generator module is arranged to generate a plurality of user interface elements each associated with a class in the first set, and generate a plurality of user interface elements each associated with a class in the second set; and to calculate, for each user interface element, at least one value indicative of a two-dimensional area based on the characteristic value associated with the class;

wherein the display module is arranged to display the plurality of user interface elements of the first set within a moveable viewing pane, whilst hiding the second set of user interface elements;

the system further comprising a receiver module arranged to receive an instruction to move the viewing pane relative to the user interface elements and, in response, cause the display module to display at least one user interface element of the second set.

29. The system of embodiment 28 wherein the display module is arranged to hide at least one user interface element of the first set, in response to receiving the instruction to move the viewing pane relative to the user interface elements.

30. The system of embodiment 28 or embodiment 29 wherein values indicative of two-dimensional areas are not calculated in respect of user interface elements for the remaining classes in the input data, wherein the remaining classes are not in the first or second set of classes.

31. The system of any one of embodiments 28 to 30 wherein the data analysis module is arranged to determine a pre-set threshold value for the number of classes in the first set and/or the second set.

32. The system of any one of embodiments 28 to 31 wherein identifying the second set of classes comprises predicting which classes a user is likely to wish to view after the classes of the first set.

33. The system of any one of embodiments 38 to 42 wherein the display module is arranged to display a map indicative of the position of the viewing pane relative to dummy elements.

34. The system of embodiment 33 wherein values indicative of two-dimensional areas for each dummy element are not calculated based on a characteristic value associated with a class.

35. The system of embodiment 34 wherein arbitrary two-dimensional areas are selected for each of the dummy elements.

36. The system of any one of embodiments 28 to 35 wherein the instruction to move the viewing pane comprises a direction; and wherein the receiver module is arranged to cause the display module to display at least one user interface element of the second set adjacent to an edge portion of the viewing pane corresponding with the direction of the instruction, in response to receiving the instruction to move the viewing pane.

37. The system of any one of embodiments 28 to 36 wherein the instruction to move the viewing pane comprises a direction; and wherein the receiver module is arranged to cause the display module to hide at least one user interface element of the first set at an edge portion of the viewing pane corresponding with the an opposite direction to the direction of the instruction, in response to receiving the instruction to move the viewing pane.

38. A computer-implemented method of generating user interface elements comprising:

identifying a plurality of classes in input data, wherein each class is associated with at least one characteristic value;

generating a plurality of user interface elements each associated with a class by calculating, for each user interface element, at least one value indicative of a two-dimensional area based on the characteristic value associated with the class of the element;

generating a position layout by determining positions for the user interface elements, wherein each position is determined independently of an axis associated with a class or a variable relating to a class;

displaying the plurality of user interface elements based on the position layout and the two-dimensional areas determined for each user interface element.

39. The method of embodiment 38 wherein each user interface element comprises an arcuate shape.

40. The method of embodiment 38 or embodiment 39 wherein each position for the user interface elements is determined by:

positioning the user interface elements relative to one another in order to minimise the area between each element.

41. The method of any one of embodiments 38 to 40 wherein the user interface elements are positioned relative to one another, such that each user interface element does not overlap with an adjacent user interface element.

42. The method of any one of embodiments 38 to 41 wherein each position for the user interface elements is determined by:

positioning the user interface elements relative to one another with a maximum distance between each user interface element.

43. The method of any one of embodiments 38 to 42 wherein the position of each user interface element is not indicative of a class or a variable associated with a class.

44. The method of any one of embodiments 38 to 43 further comprising:

identifying a plotting area within which the user interface elements are to be positioned, wherein each user interface element position is within the plotting area.

45. The method of embodiment 44 wherein each user interface element position is determined based on an axis of the plotting area, and independently of another different axis indicative of a variable associated with a class.

46. The method of any one of embodiments 38 to 45 further comprising:

determining a maximum two-dimensional area for the user interface elements, wherein the maximum two-dimensional area is associated with an upper threshold value;

identifying a class associated with a characteristic value which is equal to or greater than the upper threshold value;

assigning the maximum two-dimensional area to the area of the user interface element associated with the class associated with a characteristic value which is equal to or greater than the upper threshold value.

47. The method of embodiment 46 further comprising:

assigning a graphical signature to the user interface element associated with the class associated with a characteristic value which is equal to or greater than the upper threshold value.

48. The method of embodiment 47 wherein the graphical signature is indicative of the characteristic value which is equal to or greater than the upper threshold value.

49. The method of any one of embodiments 38 to 48 further comprising:

determining a minimum two-dimensional area for the user interface elements, wherein the minimum two-dimensional area is associated with a lower threshold value;

identifying a class associated with a characteristic value which is equal to or lower than the lower threshold value;

assigning the minimum two-dimensional area to the area of the user interface element associated with the class associated with a characteristic value which is equal to or lower than the lower threshold value.

50. The method of any one of embodiments 38 to 49 further comprising:

determining a maximum two-dimensional area for the user interface elements, wherein the maximum two-dimensional area is associated with an upper threshold value;

determining a minimum two-dimensional area for the user interface elements, wherein the minimum two-dimensional area is associated with a lower threshold value;

assigning a two-dimensional area to the area of the user interface element associated with a class which is greater than the lower threshold value and lower than the upper threshold value, based on a pre-determined relationship.

51. The method of embodiment 50 wherein the pre-determined relationship is a linear relationship between the characteristic value and the size of the two-dimensional area.

52. The method of any one of embodiments 38 to 51 wherein each class is associated with a category and each category is associated with a formatting scheme;

wherein the appearance of each user interface element is defined by the formatting scheme associated with the category of each respective class.

53. The method of embodiment 52 wherein the formatting scheme defines a colour for a user interface element.

54. The method of any one of embodiments 38 to 53 further comprising:

identifying a predicted value associated with each class;

modifying a user interface element based on the predicted value of the class associated with the user interface element.

55. The method of embodiment 54 further comprising:

generating and displaying an additional two-dimensional area based on the predicted value.

56. The method of any one of embodiments 38 to 55 wherein each user interface element is associated with continuous or discrete data, the method further comprising:

receiving a filtering instruction indicative of continuous or discrete data; and removing at least one user interface element from being displayed or repositioning at least one user interface element in response to the filtering instruction.

57. The method of embodiment 56 wherein removing at least one user interface element from being displayed or repositioning at least one user interface element in response to the filtering instruction comprises:

animating the at least one user interface element to remove it from being displayed.

58. The method of any one of embodiments 38 to 57 wherein a plurality of the user interface elements are arranged to respond to an interaction from a user.

59. The method of any one of embodiments 38 to 58 wherein a plurality of the user interface elements are selectable by the user; and in response, to the user selecting a user interface element, further information relating to the class associated with the selected user interface element is displayed.

60. The method of any one of embodiments 38 to 59 wherein each class is associated with a plurality of characteristic values each with a corresponding time stamp.

61. The method of embodiment 60 further comprising:

receiving a selection of a first time stamp;

determining a first selection of characteristic values each associated with the first time stamp;

generating the plurality of two-dimensional user interface elements for each class by determining a two-dimensional area for each user interface element based on each characteristic value from the first selection.

62. The method of embodiment 61 further comprising:

receiving a selection of a second time stamp;

determining a second selection of characteristic values each associated with the selected second time stamp;

modifying the plurality of two-dimensional user interface element for each class, by adjusting the two-dimensional area for each user interface element based on each characteristic value from the second selection.

63. The method of embodiment 62 wherein adjusting the two-dimensional area for each element comprises:

animating each user interface element from a two-dimensional area for a first characteristic value to have an adjusted two-dimensional area for a second characteristic value.

64. The method of any one of embodiments 60 to 63 further comprising displaying a time stamp adjusting element arranged to allow the user select a time stamp.

65. The method of any one of embodiments 60 to 64 further comprising:

determining a maximum time stamp and a minimum time stamp in the input data, defining a range of time stamps;

wherein the time stamp adjusting element displays the range of time stamps for selection by the user.

66. The method of any one of embodiments 60 to 65 wherein the time stamp adjusting element is arranged to allow the user to select a plurality of time stamps within the range.

67. The method of any one of embodiments 38 to 66 further comprising:

identifying a first set of classes and a second set of classes in the plurality of classes;

generating a plurality of user interface elements each associated with a class in the first set;

generating a plurality of user interface elements each associated with a class in the second set;

calculating, for each user interface element, at least one value indicative of a two-dimensional area based on the characteristic value associated with the class;

displaying the plurality of user interface elements of the first set within a moveable viewing pane, whilst hiding the second set of user interface elements;

receiving an instruction to move the viewing pane relative to the user interface elements and, in response, displaying at least one user interface element of the second set.

68. The method of embodiment 67 further comprising:

in response to receiving the instruction to move the viewing pane relative to the user interface elements, hiding at least one user interface element of the first set.

69. The method of embodiment 67 or embodiment 68 wherein values indicative of two-dimensional areas are not calculated in respect of user interface elements for the remaining classes in the input data, wherein the remaining classes are not in the first or second set of classes.

70. The method of any one of embodiments 67 to 69 determining a pre-set threshold value for the number of classes in the first set and/or the second set.

71. The method of any one of embodiments 67 to 70 wherein identifying the second set of classes comprises:

predicting which classes a user is likely to wish to view after the classes of the first set.

72. The method of any one of embodiments 67 to 71 further comprising:

displaying a map indicative of the position of the viewing pane relative to dummy elements.

73. The method of embodiment 72 wherein values indicative of two-dimensional areas for each dummy element are not calculated based on a characteristic value associated with a class.

74. The method of embodiment 73 wherein arbitrary two-dimensional areas are selected for each of the dummy elements.

75. The method of any one of embodiments 67 to 74 wherein the instruction to move the viewing pane comprises a direction, and the method further comprises:

in response to receiving the instruction to move the viewing pane, displaying at least one user interface element of the second set adjacent to an edge portion of the viewing pane corresponding with the direction of the instruction.

76. The method of any one of embodiments 67 to 75 wherein the instruction to move the viewing pane comprises a direction, and the method further comprises:

in response to receiving the instruction to move the viewing pane, hiding at least one user interface element of the first set at an edge portion of the viewing pane corresponding with the an opposite direction to the direction of the instruction.

77. A computer program comprising code portions which when run a computer cause the computer to carry out the method of any one of embodiments 38 to 76.

78. A computer-readable data carrier having stored thereon the computer program of embodiment 77.

The invention claimed is:

1. A computer-implemented method of generating user interface elements comprising:

identifying a plurality of classes in input data, wherein each class is associated with at least one characteristic value;

generating a plurality of user interface elements each associated with a class by calculating, for each user interface element, at least one value indicative of a two-dimensional area based on the characteristic value associated with the class of the element;

generating a position layout by determining positions for the user interface elements, wherein each position is determined independently of an axis associated with a class or a variable relating to a class; and displaying the plurality of user interface elements based on the position layout and the two-dimensional areas determined for each user interface element;

wherein the position of each user interface element is not indicative of a class or a variable associated with a class.

2. The method of claim 1 wherein each user interface element comprises an arcuate shape.

3. The method of claim 1 wherein each position for the user interface elements is determined by positioning the user interface elements relative to one another in order to minimise the area between each element.

4. The method of claim 1 wherein the user interface elements are positioned relative to one another, such that each user interface element does not overlap with an adjacent user interface element.

5. The method of claim 1 wherein each position for the user interface elements is determined by positioning the user interface elements relative to one another with a maximum distance between each user interface element.

6. The method of claim 1 further comprising identifying a plotting area within which the user interface elements are to be positioned, wherein each user interface element position is within the plotting area.

7. The method of claim 6 wherein each user interface element position is determined based on an axis of the plotting area, and independently of another different axis indicative of a variable associated with a class.

8. The method of claim 1 further comprising:
determining a maximum two-dimensional area for the user interface elements, wherein the maximum two-dimensional area is associated with an upper threshold value;
identifying a class associated with a characteristic value which is equal to or greater than the upper threshold value;
assigning the maximum two-dimensional area to the area of the user interface element associated with the class associated with a characteristic value which is equal to or greater than the upper threshold value.

9. The method of claim 8 further comprising:
assigning a graphical signature to the user interface element associated with the class associated with a characteristic value which is equal to or greater than the upper threshold value.

10. The method of claim 9 wherein the graphical signature is indicative of the characteristic value which is equal to or greater than the upper threshold value.

11. The method of claim 1 wherein further comprising:
determining a minimum two-dimensional area for the user interface elements, wherein the minimum two-dimensional area is associated with a lower threshold value;
identifying a class associated with a characteristic value which is equal to or lower than the lower threshold value;
assigning the minimum two-dimensional area to the area of the user interface element associated with the class associated with a characteristic value which is equal to or lower than the lower threshold value.

12. The method of claim 1 further comprising:
determining a maximum two-dimensional area for the user interface elements, wherein the maximum two-dimensional area is associated with an upper threshold value;
determining a minimum two-dimensional area for the user interface elements, wherein the minimum two-dimensional area is associated with a lower threshold value;
assigning a two-dimensional area to the area of the user interface element associated with a class which is greater than the lower threshold value and lower than the upper threshold value, based on a pre-determined relationship.

13. The method of claim 12 wherein the pre-determined relationship is a linear relationship between the characteristic value and the size of the two-dimensional area.

14. The method of claim 1 wherein each class is associated with a category and each category is associated with a formatting scheme;
wherein the appearance of each user interface element is defined by the formatting scheme associated with the category of each respective class.

15. The method of claim 14 wherein the formatting scheme defines a colour for a user interface element.

16. The method of claim 1 further comprising:
identifying a predicted value associated with each class;
modifying a user interface element based on the predicted value of the class associated with the user interface element.

17. The method of claim 16 wherein the method further comprises generating and displaying an additional two-dimensional area based on the predicted value.

18. The method of claim 1 wherein each user interface element is associated with continuous or discrete data, the method further comprising:
receiving a filtering instruction indicative of continuous or discrete data; and
removing at least one user interface element from being displayed or repositioning at least one user interface element in response to the filtering instruction;
wherein, optionally, removing at least one user interface element from being displayed or repositioning at least one user interface element in response to the filtering instruction comprises animating the at least one user interface element to remove it from being displayed.

19. A non-transitory computer-readable data carrier having stored thereon a computer program configured to generate user interface elements which when run on a computer causes the computer to:
identify a plurality of classes in input data, wherein each class is associated with at least one characteristic value;
generate a plurality of user interface elements each associated with a class by calculating, for each user interface element, at least one value indicative of a two-dimensional area based on the characteristic value associated with the class of the element;
generate a position layout by determining positions for the user interface elements, wherein each position is determined independently of an axis associated with a class or a variable relating to a class; and
display the plurality of user interface elements based on the position layout and the two-dimensional areas determined for each user interface element;
wherein the position of each user interface element is not indicative of a class or a variable associated with a class.

20. A system for generating user interface elements comprising a processor configured to:
identify a plurality of classes in input data, wherein each class is associated with at least one characteristic value;
generate a plurality of user interface elements each associated with a class by calculating, for each user interface element, at least one value indicative of a two-dimensional area based on the characteristic value associated with the class of the element;
generate a position layout by determining positions for the user interface elements, wherein each position is determined independently of an axis associated with a class or a variable relating to a class; and
display the plurality of user interface elements based on the position layout and the two-dimensional areas determined for each user interface element;
wherein the position of each user interface element is not indicative of a class or a variable associated with a class.

* * * * *